(12) United States Patent
Aerts et al.

(10) Patent No.: US 9,042,662 B2
(45) Date of Patent: May 26, 2015

(54) METHOD AND SYSTEM FOR SEGMENTING AN IMAGE

(75) Inventors: Maarten Aerts, Beveren-Waas (BE); Donny Tytgat, Gent (BE); Sammy Lievens, Brasschaat (BE)

(73) Assignee: Alcatel Lucent, Boulogne-Billancourt (FR)

( * ) Notice: Subject to any disclaimer, the term of this patent is extended or adjusted under 35 U.S.C. 154(b) by 16 days.

(21) Appl. No.: 13/992,522

(22) PCT Filed: Dec. 7, 2011

(86) PCT No.: PCT/EP2011/072034
§ 371 (c)(1),
(2), (4) Date: Jun. 7, 2013

(87) PCT Pub. No.: WO2012/076586
PCT Pub. Date: Jun. 14, 2012

(65) Prior Publication Data
US 2013/0251260 A1 Sep. 26, 2013

(30) Foreign Application Priority Data
Dec. 8, 2010 (EP) .................................. 10306378

(51) Int. Cl.
*G06K 9/62* (2006.01)
*G06T 7/00* (2006.01)
*G06K 9/68* (2006.01)

(52) U.S. Cl.
CPC .................................. *G06T 7/0081* (2013.01)

(58) Field of Classification Search
CPC .................................. G06T 1/00; G06T 5/00
USPC ......... 382/162, 164, 173, 180, 219–220, 224, 382/264; 375/240.02
See application file for complete search history.

(56) References Cited

U.S. PATENT DOCUMENTS 5,774,581 A * 6/1998 Fassnacht et al. ............. 382/180
7,609,894 B2 * 10/2009 Zaklika et al. ................ 382/224
(Continued)

FOREIGN PATENT DOCUMENTS

CN 101416219 A 4/2009
WO WO 2007/093199 A3 8/2007

OTHER PUBLICATIONS

Justin Talbot et al., "Implementing GrabCut," Brigham Young University, XP002631104, 4 pages, Apr. 7, 2006.
Abhilash, "Natural Image and Video Matting," International Conference on Computational Intelligence and Multimedia Applications, XP031535095, pp. 469-475, Dec. 13, 2007.
Ryan Crabb et al., "Real-time Foreground Segmentation via Range and Color Imaging," Computer Vision and Pattern Recognition Workshops, IEEE, XP031285726, pp. 1-5, Jun. 2, 2008.
A. Criminisi et al., "Bilayer Segmentation of Live Video," IEEE Computer Society Conference on Computer Vision and Pattern Recognition, XP010922732, pp. 1-8, Jun. 17, 2006.
International Search Report for PCT/EP2011/072034 dated May 22, 2012.

*Primary Examiner* — Amir Alavi
(74) *Attorney, Agent, or Firm* — Fay Sharpe LLP (57) ABSTRACT

The invention pertains to a method for segmenting an image from a sequence of video images into a foreground and a background, the image being composed of pixels, the method includes assigning an initial foreground probability to each of the pixels; assigning a set of probability propagation coefficients to each of the pixels; and applying a global optimizer to the initial foreground probabilities of the pixels to classify each of the pixels as a foreground pixel or a background pixel, to obtain a definitive foreground map; wherein the global optimizer classifies each processed pixel in function of the initial foreground probability of the processed pixel and the initial foreground probability of neighboring pixels, the relative weight of the initial foreground probability of neighboring pixels being determined by the probability propagation coefficients of the neighboring pixels.

15 Claims, 3 Drawing Sheets

(56) References Cited

U.S. PATENT DOCUMENTS

| | | | |
|---|---|---|---|
| 7,869,648 B2 * | 1/2011 | Schiller et al. | 382/159 |
| 8,175,376 B2 * | 5/2012 | Marchesotti et al. | 382/159 |
| 8,175,379 B2 * | 5/2012 | Wang et al. | 382/164 |
| 8,290,253 B1 * | 10/2012 | Wang et al. | 382/162 |
| 2002/0186881 A1 | 12/2002 | Li | |
| 2007/0286520 A1 | 12/2007 | Zhang et al. | |
| 2011/0102628 A1 | 5/2011 | Ciuc et al. | |
| 2013/0251260 A1 * | 9/2013 | Aerts et al. | 382/173 |

* cited by examiner

METHOD AND SYSTEM FOR SEGMENTING AN IMAGE

This application is a 371 of PCT/EP2011/072034 filed on 7 Dec. 2011.

FIELD OF INVENTION

The present invention relates to the field of video image processing, in particular foreground detection in video images.

BACKGROUND

Certain visual applications require separating the foreground from the background in images of a video feed in order to put the foreground subject into another context. Classical applications of such a separation and recombination are the representation of the TV weather person in front of a virtual meteorological map, commercials that appear to be filmed in an exotic scenery, super heroes in movies that appear to be present in artificial sceneries or flying in the sky. Such representations have in common that their human subjects are recorded in a studio and that the background is replaced by a new one. The procedure is relatively easy if the original background can be controlled, or if it is fully known to the video processing unit. This is the case for the examples above, which are recorded in a specially designed studio.

The present invention deals with the problems that arise when the above mentioned technique has to be used with an arbitrary background, which has to be detected or learned by the video processing unit.

SUMMARY

According to an aspect of the present invention, there is provided a method for segmenting an image from a sequence of video images into a foreground and a background, the image being composed of pixels, the method comprising: assigning an initial foreground probability to each of the pixels; assigning a set of probability propagation coefficients to each of the pixels; and applying a global optimizer to the initial foreground probabilities of the pixels to classify each of the pixels as a foreground pixel or a background pixel, to obtain a definitive foreground map; wherein the global optimizer classifies each processed pixel in function of the initial foreground probability of the processed pixel and the initial foreground probability of neighboring pixels, the relative weight of the initial foreground probability of neighboring pixels being determined by the probability propagation coefficients of the neighboring pixels.

It is an advantage of the present invention that it obtains a high efficiency by combining a "soft" classification based on a probabilistic model which may consist of a single pass, with an iterative edge-aware filter that makes sure that the foreground cut out is consistent with the actual edges of the objects represented in the image. The assigning of a foreground probability is typically based on a heuristic. The detection of edges is abstracted to an assessment of the degree to which neighboring pixels or regions are correlated, which determines the degree to which they should be allowed to influence each other's classification as foreground or background. Each pixel is thus assigned a set of probability propagation coefficients, which includes estimates of the probability that an edge is present in the image between the pixel of interest and one or more neighboring pixels.

In an embodiment of the method of the present invention, the assigning of the foreground probability comprises applying at least a first heuristic probability assignment algorithm and a second heuristic probability assignment algorithm, and determining the foreground probability by combining a result of the first heuristic probability assignment algorithm with a result of the second heuristic probability assignment algorithm.

Accordingly, the accuracy and robustness of the method of the invention may be improved by combining two or more different heuristic models, to obtain a better estimate of whether a given pixel is a foreground pixel or not.

In a specific embodiment, one of the first heuristic probability assignment algorithm and the second heuristic probability assignment algorithm comprises comparing the pixels to a background color model.

This embodiment takes advantage of any a priori knowledge about the background that may be available to the system, but it may additionally or alternatively rely on knowledge about the background that is acquired during the performance of the method of the invention. Acquired knowledge includes knowledge about the same image contributed by other sources of foreground probability information, in particular another heuristic, and/or information about previous images in the same video stream, for which the foreground/background segmentation has already taken place. By a judicious incorporation of acquired information, the need for a preliminary training phase can be reduced or eliminated.

In a specific embodiment, one of the first heuristic probability assignment algorithm and the second heuristic probability assignment algorithm comprises applying a human body model.

This embodiment takes advantage of the fact that the object of interest in the most common foreground extraction applications is a human being, typically a human being standing or sitting in front of a camera.

In an embodiment, the method of the present invention further comprises updating a parameter of at least one of the first heuristic probability allocation algorithm and the second heuristic probability allocation algorithm on the basis of the definitive foreground map.

It is an advantage of this embodiment that the heuristic algorithms used for the soft classification step are dynamically updated and therefore become gradually more accurate. The system employing the method thus becomes self-learning to a certain extent, resulting in more efficient and/or more accurate processing of subsequent video images, based on the assumption that the background does not change significantly from one image to the next.

In an embodiment, the method of the present invention further comprises a post-processing step for removing allocation artifacts.

The additional post-processing step may improve the visual quality of the resulting image, by eliminating parts of the alleged foreground which are unlikely to be actual foreground (i.e., "false positives" of the foreground detection process), for instance because they have a shape and/or dimensions that are uncharacteristic for foreground objects. Conversely, parts of alleged background which are unlikely to be actual background (i.e., "false negatives" of the foreground detection process) may be restored to foreground status.

In a specific embodiment, the post-processing step comprises applying morphological operators.

In a specific embodiment, the post-processing step comprises applying a connected-component algorithm.

In an embodiment of the method according to the present invention, the global optimizer is an iteratively applied bilateral filter According to another aspect of the invention, there is provided a computer program product which, when executed, causes the computer to perform the method according to the invention.

According to another aspect of the invention, there is provided a system for segmenting an image from a sequence of video images into a foreground and a background, the image being composed of pixels, the system comprising: an input interface for obtaining the image; an assignment engine for assigning an initial foreground probability to each of the pixels; a contour detector for assigning a set of probability propagation coefficients to each of the pixels; and a global optimizer for operating on the initial foreground probabilities of the pixels to create a definitive foreground map by classifying each of the pixels as a foreground pixel or a background pixel; and an output interface to provide the definitive foreground map; wherein the global optimizer is adapted to classify each processed pixel in function of the initial foreground probability of the processed pixel and the initial foreground probability of neighboring pixels, the relative weight of the initial foreground probability of neighboring pixels being determined by the probability propagation coefficients of the neighboring pixels.

In an embodiment of the system according to the invention, the assignment engine is adapted to apply at least a first heuristic probability assignment algorithm and a second heuristic probability assignment algorithm, and to determine the foreground probability by combining a result of the first heuristic probability assignment algorithm with a result of the second heuristic probability assignment algorithm.

In a specific embodiment, one of the first heuristic probability assignment algorithm and the second heuristic probability assignment algorithm comprises comparing the pixels to a background color model.

In a specific embodiment, one of the first heuristic probability assignment algorithm and the second heuristic probability assignment algorithm comprises applying a human body model.

In an embodiment, the system according to the present invention is further adapted to update a parameter of at least one of the first heuristic probability allocation algorithm and the second heuristic probability allocation algorithm on the basis of the definitive foreground map.

In an embodiment, the system according to the invention further comprises a post-processor for removing allocation artifacts from the definitive foreground map.

In an embodiment of the system according to the present invention, the global optimizer is an iterative bilateral filter The advantages of the embodiments of the computer program product and the system according to the invention are the same, mutatis mutandis, as those of the corresponding embodiments of the method according to the invention.

BRIEF DESCRIPTION OF THE FIGURES

Some embodiments of apparatus and/or methods in accordance with embodiments of the present invention are now described, by way of example only, and with reference to the accompanying drawings, in which.

DESCRIPTION OF EMBODIMENTS

Embodiments of the present invention may be used, without limitation, to segment the foreground for a home application, like immersive chatting or video conferences.

It is a purpose of embodiments of the present invention to detect the foreground, i.e. regions of interest in the image that must not be replaced by the chosen substitute background. This detection has to segment the image along the actual edges of the object of interest, i.e. it must be accurate, and work correctly under varying circumstances, i.e. it must be robust.

Known foreground detection techniques suffer drawbacks including a need for an initialization phase (in particular to train the background model), and a sensitivity to even small changes in lighting conditions or camera position.

The present invention is based inter alia on the insight that it is advantageous not to base the foreground estimation solely on a color model, but rather on one or more heuristic probabilities indicating that a pixel might or might not be foreground, combining these probabilities where applicable, including object boundary information and eventually solving the global segmentation problem.

The heuristics may include imposing a body model (optionally based on a face-detector), using depth information, using motion, using skin-color, foreground color histogram, etc., on top of having a traditional background color and/or an edge model. All heuristics yield a foreground-probability map. These maps are combined into one rough pre-estimate.

Since no boundary information of the original image is included yet, the above-mentioned rough estimate will not accurately follow the edges of objects. It may be considered as a soft classification of the pixels.

According to the invention, it is advantageous to apply a filtering algorithm to equal out the probabilities of individual regions bounded by edges in such way that each contiguous region is either considered to be wholly background or wholly foreground. This filtering algorithm, which may be compared to "coloring between the lines" comprises solving a global optimization problem posed by a data term, following from the probability maps, and a smoothing term, following from the object boundaries. The filtering algorithm may be an iterative algorithm.

It is advantageous to further improve the quality of the output of the filtering algorithm by applying a post-processing step.

The foreground/background map obtained through the steps recited above, may be fed back to one or more heuristic models, to update the parameters of these models. Also the output foreground estimation itself may act as a heuristic on its own for the foreground estimation of the next input video frame, because foreground of subsequent frames tend to be similar.

Figure 1:
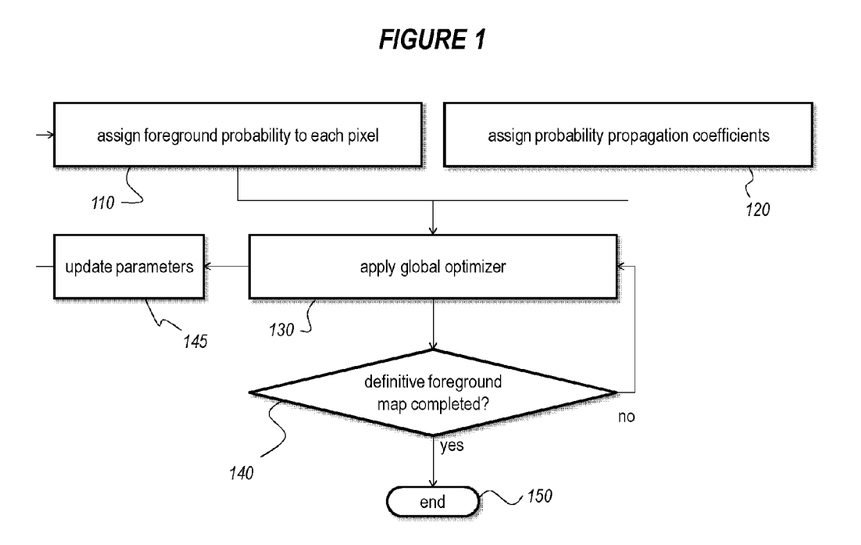
FIG. 1 comprises a flow chart of an embodiment of the method according to the invention.

FIG. 1 comprises a flow chart of an embodiment of the method according to the invention.

In a first step 110, a soft classification of all pixels is performed, which comes down to assigning to each pixel a certain probability that the pixel belongs to the foreground.

In a second step 120, a set of probability propagation coefficients is assigned to each of the pixels. This is a generalized way to detect edges in the images; it could thus be considered a "soft" edge detection (herein also referred to as "contour detection"). The probability propagation coefficients represent the degree to which neighboring pixels or regions are correlated, which in the context of the present invention determines the degree to which they are allowed to influence each other's classification as foreground or background.

In an embodiment, the set of probability propagation coefficients includes four probability values for each pixel, representing the respective probabilities that an object edge is present between the pixel of interest and each of the four surrounding pixels (not counting diagonally adjacent pixels). In a different embodiment, the set of probability propagation coefficients includes eight probability values for each pixel (including diagonally adjacent pixels). Other configurations are also possible.

In an embodiment, the probability propagation coefficients are limited to the values 0 and 1, which results in a "hard" edge detection. If "hard" edge detection is used, the image is de facto segmented in contiguous regions in this step 120.

Edge detection (either "hard" or "soft") can take place in any of the known ways, including the detection of significant steps in the spatial distribution of the intensity or the chroma of the pixels of the image.

In a third step 130, a global optimizer is applied to smoothen out the probability map, using the detected edges as boundaries to obtain a segmentation into homogenous foreground objects and background objects.

The global optimizer may be applied under the form of a single-pass or an iterative algorithm, e.g. a bilateral filter. Accordingly, a completion test may be provided at step 140, which determines whether another pass of the algorithm is required or not before the definitive foreground/background map is outputted 150. The completion test may include a test relating to the quality of the segmentation that has been obtained, but it may also be a simple counter that enforces a predetermined number of algorithm passes.

The end result, or any intermediate result, of the illustrated process may be used in a feedback loop to update 145 the parameters of the probability assignment algorithms.

The order in which the steps are presented is without significance, unless the above description implies that one step cannot take place before the completion of another step. For example, the second step 120 may freely be performed before, during, or after the first step 110, because these two steps are functionally independent.

Figure 2:
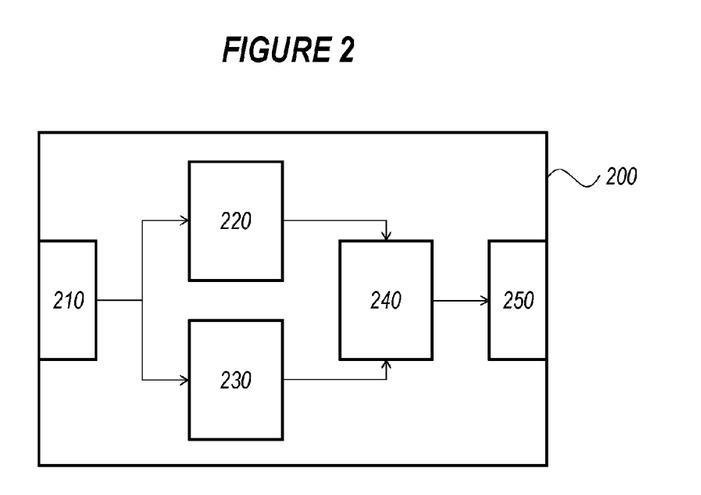
FIG. 2 comprises a block diagram of an embodiment of the system according to the invention.

FIG. 2 comprises a block diagram of an embodiment of the system 200 according to the invention.

The block diagram schematically shows an input interface 210 for obtaining the image to be processed. The interface may be present as a physical and/or a functional interface. The image may for example be obtained over a network, by reading a physical medium, or by invoking a software function call.

The obtained image to be processed is forwarded to the assignment engine 220 which serves to assign a foreground probability to each pixel of the image.

The obtained image to be processed is also forwarded to the contour detector 230 which serves to assign probability propagation coefficients as described above, which will further on allow segmenting the image into a plurality of contiguous regions.

Without loss of generality, the forwarding of the image to the assignment engine 220 and the contour detector 230 is illustrated as a parallel connection.

The information resulting from the operation of the assignment engine 220 and the contour detector 230 is passed on to the global optimizer 240 which serves to create a definitive foreground/background map by classifying each region as a foreground region or a background region. The global optimizer 240 may be an iterative bilateral filter.

Finally, the definitive foreground/background map is made available to the system user via an output interface 250, which may again be present as a physical and/or a functional interface. In particular, the output image may be made available through a network, written on a physical medium, or held for retrieval by a subsequent software function call.

The functions of the various elements shown in the figures, including any functional blocks described "interfaces" or "engines", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "engine" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

Figure 3:
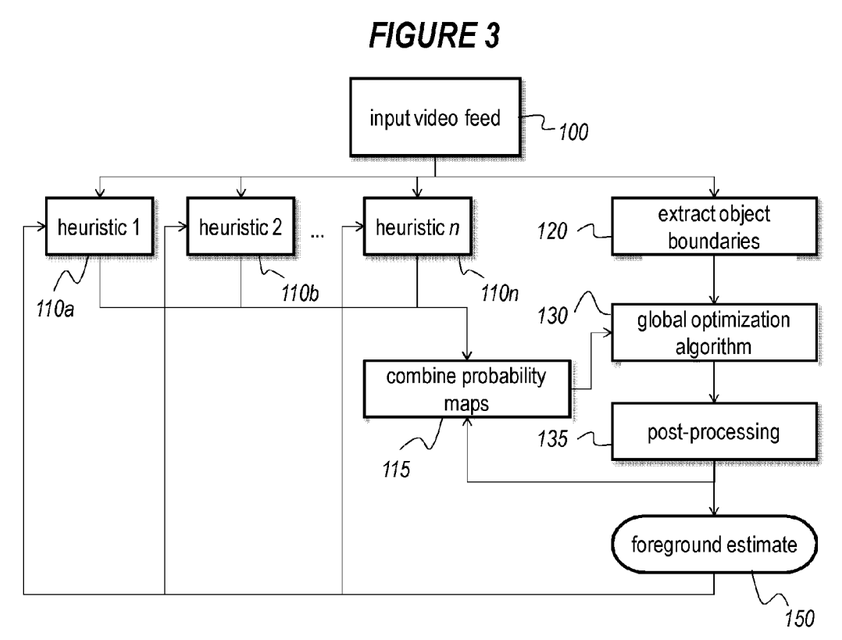
FIG. 3 comprises a flow chart of a further embodiment of the method according to the invention.

FIG. 3 comprises a flow chart of a further embodiment of the method according to the invention. In this embodiment, several heuristics 110a, 110b, . . . , 110n are used. Different types of heuristics in all kinds of combinations yield a plurality of possible specific embodiments, following the same principle as stated above. The probabilities obtained from the respective heuristic probability assignment steps 110a, 110b, . . . , 110n have to be combined 115 into a single probability that is used in the global optimization 130. FIG. 3 also illustrates the optional post-processing step 135. The result of the post-processing step 135 (or of the global optimization algorithm 130, if no post-processing is performed) may be fed back to the probability combiner 115 to be treated as an additional heuristic. The end result of the foreground estimate 150 may be fed back to the heuristics 110a, 110b, . . . , 110n to update the parameters used by the latter, where applicable.

Figure 4:
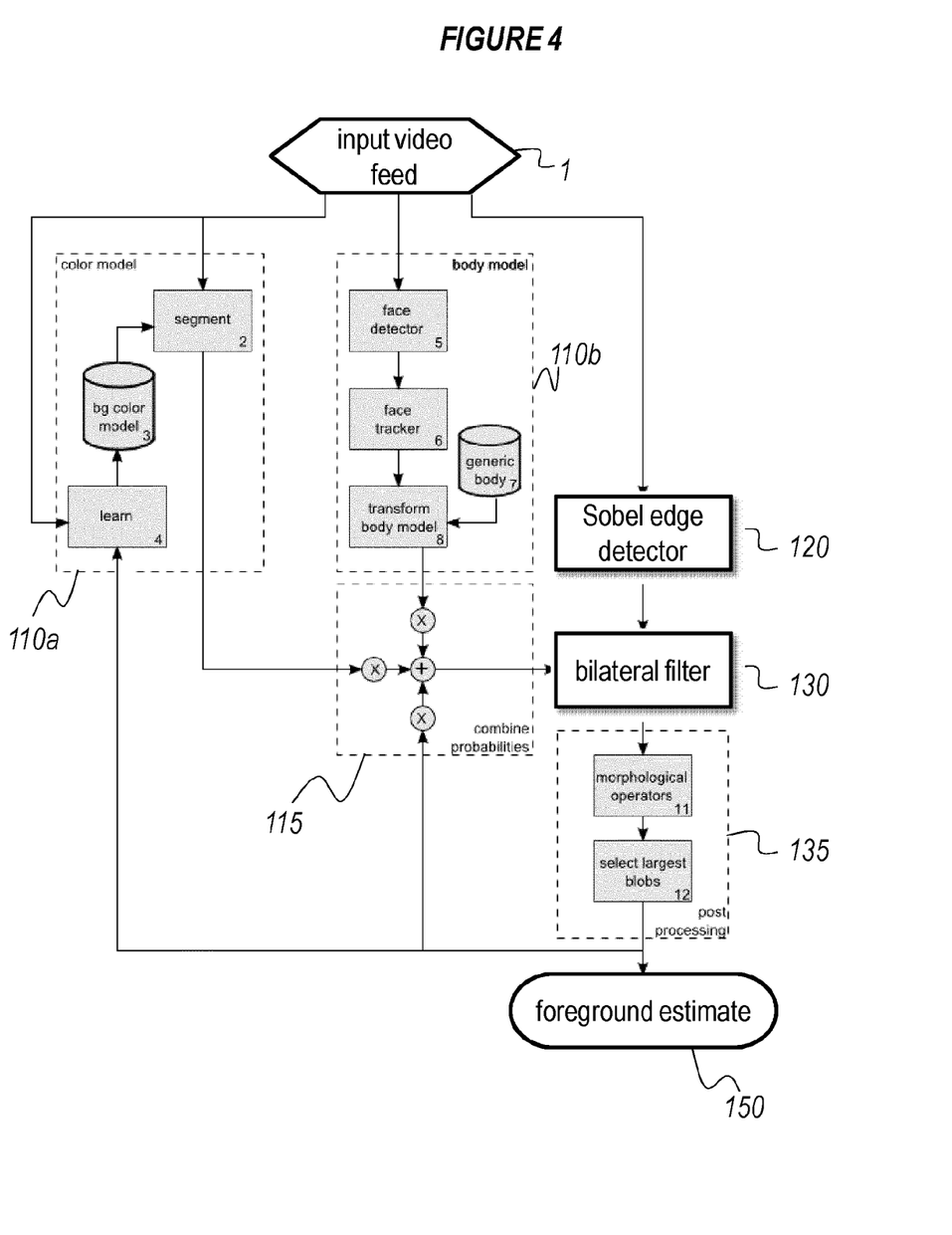
FIG. 4 comprises a flow chart of a further embodiment of the method according to the invention.

Without loss of generality, FIG. 4 illustrates a further embodiment using two heuristics: a color model 110a and a body model 110b. The color model 110a may be based on a known adaptive background color model. The "Vibe" model may be used for this purpose, but other known models may be equally suitable. "Vibe" is a known technique which uses a dynamic set of color samples at each pixel to represent the background color distribution. As the model is not trained during an initialization phase, the method is adapted to incorporate a confidence measure. At initialization, this confidence is put to zero for all pixels, implying that no background color information is known at that point. Further implementation details pertaining to "Vibe" can be found in the European patent specification EP 2 015 252 B1, entitled "Visual background extractor".

A stand-alone color model suffers from several drawbacks, including the need for an initialization procedure, where no object-of-interest is in the scope of the camera, only background, so the system can learn the background model. It would also eventually fade motionless foreground into the background because of the time-constant inherent to adaptivity. It is therefore advantageous to incorporate an optional second heuristic. The illustrated embodiment uses a very generic body model probability based upon a face tracker.

The camera input feed 1 gets picked up by a face detector 5 (e.g. Viola-Jones, haarwavelet-classifier, . . . ). Because these detectors might produce false positives and in view of the noise on the position and size of the face, the resulting face candidates get filtered and tracked 6 to produce a single good estimate of the face bounding box (i.e. position and size). Using face position and size obtained in this manner, we transform 8 (mere translation and rescaling) a very generic body probability map 7 to match the face in the input video feed. This acts as the basis for the first heuristic probability assignment algorithm 110b for our foreground estimation.

A background color model 3 is used as the basis for the second heuristic probability assignment algorithm 110a. Various techniques exist, like background subtraction, Gaussian mixture models, or "Vibe".

Each frame a segmenting module 2 compares the input video feed against this background model and outputs a foreground probability map. If the confidence measure is low, the foreground probability will be close to 50%. If a good match is detected between the color model and the input feed color of a pixel, its foreground probability will be close to 0, otherwise it is more likely to be foreground and the probability will be closer to 100%. If this is done for every pixel, this yields another probability map.

The color model is preferably updated 4 on the basis of the final result obtained after combining all probabilities and incorporating object boundaries. The confidence measure for each pixel is also updated. It increases with newly learned color samples and decreases slowly if no color observation is made for a long time, posing a learning time constant, which will be compensated by a feed-back loop and the other heuristic to prevent the fading to background problem.

The two probability maps 2, 8, together with a probability map resulting from the foreground segmentation of a previous frame 12 are fed into the probability combination module 115. If no previous frame information is available, the foreground-background probability map is globally initialized at 50%. The probability combination may be a simple multiply-add operation, or any other known operation for compositing probabilities. The result is used as an input to the global optimization method 130.

In the illustrated embodiment, object boundaries are determined by a Sobel edge detector 120, which is a simple gradient method. Alternatively, known techniques such as Laplace edge detectors, Canny edge detectors, and true segmentation methods may be used. This result is also used as an input to the global optimization method 130.

The global optimizer 130 used in the invention may be implemented by any of the known techniques, including Graph Cut, Belief Propagation, and their variants. The illustrated embodiment uses a bilateral filter 130 as a global optimizer. The module approaches the foreground estimation problem as a global optimization problem, which has to be solved iteratively, but locally. The input probability map obtained from combining the probability maps 115 acts as a data term, while the object boundaries obtained from the Sobel edge detector 120 act as a smoothening term. At each iteration of the algorithm, and for each pixel, the probability map is updated by a weighted combination of the probabilities of its neighbors. These weights are large when no object boundary is between the neighboring pixels and small otherwise. This way high foreground probabilities at one pixel propagate over the image until object boundaries are met. This is also true for low foreground probabilities (i.e. high background probabilities). It resembles coloring between the object boundaries of the foreground probabilities, eventually saturating to a full 100% foreground or a full 100% background.

This bilateral filter module 130 can be implemented in a layered multi-level way to increase performance. Furthermore, it may implement different kinds of probability combiners.

The output of the bilateral filter module 130 may still yield some artifacts around regions with a lot of object boundaries, because there probability propagation is countered a lot. It may therefore be advantageous to apply some post-processing 135. In this embodiment morphological operators 11 like dilution and erosion are used to eliminate these artifacts. Then a connected-component module 12 is used to only select objects of a relevant minimal size. Tracking and similar techniques may also be applied. It will be clear to the skilled person that various combinations of these techniques may be selected, depending on the requirements of the specific application.

The final output can be reused as a foreground estimate 150 by the application, for instance to do background substitution. Also, it is fed back into the probability combiner 115, since foreground probability in one frame for a pixel increases the probability of foreground of that pixel in the next frame. It is also this final result which is used by the "Vibe" learning module 4 to update the color model 3. Samples at pixels labeled background are learned more quickly than regions labeled foreground.

The illustrated embodiment combines the advantages of two techniques. The generic body model will help bootstrap the learning function within the color model and keep doing so along the way. Because the learning time constant may be a lot smaller in this case than in a stand-alone background model based technique, making it more adaptive to light changes, camera movement etc., it continues to require external information from the other heuristics through the described system.

Other heuristics may be used to detect foreground, provided that the heuristic is based on an adequate definition of the "foreground" as the set of objects of interest. Different definitions result in different embodiments. Some heuristics are especially good at segmenting images comprising people, but suitable heuristics may be defined to segment images comprising objects of any arbitrary type.

If foreground is defined as the set of objects being spatially close to the camera, depth information can be used as a fairly good heuristic. This depth information can come from processing image-pairs from a stereo-pair, from time-of-flight cameras, and the likes. Because this processing tends to be a lot less accurate than needed for foreground segmentation (the method being especially prone to labeling objects in the background as foreground), feeding it through the global optimization module—with or without combination with other heuristics—is still needed.

In a human-detection oriented heuristic, we may define skin-colored pixels as being foreground. A probability map may thus be created with a lot of unknown 50% probabilities, but with some high foreground probabilities as well at the position of the face and the hands.

In a similar way, a foreground color model can be established in a gradual way, incorporating for instance a pixel-dependent and/or region-dependent histogram of colors occurring in the foreground: skin colors, hair colors, clothing colors or textures.

Foreground may also be defined as being moving pixels. A motion estimation algorithm like optical flow can be used to indicate moving pixels, which will get a high foreground probability. Since a lack of motion does not necessarily mean that the region in question is not foreground, pixels with no motion will get a foreground probability slightly below 50%. This rough initial classification may still yield good results thanks to the feedback-loop in the system.

A background edge model can be built, wherein regions were edges appear or disappear are indicated as foreground, leaving the other regions at 50% probability.

As illustrated by the above examples, embodiments of the present invention may present the following advantages:

no need an initialization phase or a green screen;
fast stabilization when the camera is moved;
adaptiveness to lighting condition changes without the disadvantage that foreground gradually fades to background;
use of more intelligent heuristics to find foreground, the way the human visual system does;
explicit use of object boundaries as boundaries for the segmentation.

A person of skill in the art would readily recognize that steps of various above-described methods can be performed by programmed computers. Herein, some embodiments are intended to cover program storage devices, e.g., digital data storage media, which are machine or computer readable and encode machine-executable or computer-executable programs of instructions where said instructions perform some or all of the steps of methods described herein. The program storage devices may be, e.g., digital memories, magnetic storage media such as a magnetic disks or tapes, hard drives, or optically readable digital data storage media. The embodiments are also intended to cover computers programmed to perform said steps of methods described herein.

The invention has been described herein by means of several exemplary embodiments. These embodiments serve to illustrate but not to limit the invention. It will be clear to the skilled person that features described with respect to one embodiment, may be freely combined with features described in other embodiments, to obtain the described effects and/or advantages of said features.

The invention claimed is:

1. A method for segmenting an image from a sequence of video images into a foreground and a background, the image being composed of pixels, the method comprising:
    assigning an initial foreground probability to each of the pixels;
    assigning a set of probability propagation coefficients to each of the pixels; and
    applying a global optimizer to the initial foreground probabilities of the pixels to classify each of the pixels as a foreground pixel or a background pixel, to obtain a definitive foreground map,
        wherein the global optimizer classifies each processed pixel as a function of the initial foreground probability of the processed pixel and the initial foreground probability of neighboring pixels, the relative weight of the initial foreground probability of neighboring pixels being determined by the probability propagation coefficients of the neighboring pixels.

2. The method according to claim 1, wherein the assigning of the foreground probability comprises:
    applying at least a first heuristic probability assignment algorithm and a second heuristic probability assignment algorithm, and
    determining the foreground probability by combining a result of the first heuristic probability assignment algorithm with a result of the second heuristic probability assignment algorithm.

3. The method according to claim 2, wherein one of the first heuristic probability assignment algorithm and the second heuristic probability assignment algorithm comprises comparing the pixels to a background color model.

4. The method according to claim 2, wherein one of the first heuristic probability assignment algorithm and the second heuristic probability assignment algorithm comprises applying a human body model.

5. The method according to claim 2, further comprising updating a parameter of at least one of a first heuristic probability allocation algorithm and a second heuristic probability allocation algorithm on the basis of the definitive foreground map.

6. The method according to claim 1, further comprising post-processing to remove allocation artifacts.

7. The method according to claim 6, wherein the post-processing further comprises applying morphological operators.

8. The method according to claim 6, wherein the post-processing further comprises applying a connected-component algorithm.

9. The method of claim 1, wherein the global optimizer is an iteratively applied bilateral filter.

10. A method implemented by a non-transitory computer readable storage medium, in which a program is saved, the program comprising instructions which, when they are executed in a programmable device, are operable to segment an image from a sequence of video images into a foreground and a background, the image being composed of pixels, the segmenting comprising:
    assigning an initial foreground probability to each of the pixels;
    assigning a set of probability propagation coefficients to each of the pixels; and
    applying a global optimizer to the initial foreground probabilities of the pixels to classify each of the pixels as a foreground pixel or a background pixel, to obtain a definitive foreground map,
        wherein the global optimizer classifies each processed pixel in function of the initial foreground probability of the processed pixel and the initial foreground probability of neighboring pixels, the relative weight of the initial foreground probability of neighboring pixels being determined by the probability propagation coefficients of the neighboring pixels.

11. A system for segmenting an image from a sequence of video images into a foreground and a background, the image being composed of pixels, the system comprising:
    an input interface for configured to obtain the image;
    an assignment engine configured to assign an initial foreground probability to each of the pixels;
    a contour detector configured to assign a set of probability propagation coefficients to each of the pixels; and
    a global optimizer for operating on the initial foreground probabilities of the pixels to create a definitive foreground map by classifying each of the pixels as a foreground pixel or a background pixel; and
    an output interface configured to provide the definitive foreground map, wherein the global optimizer is configured to classify each processed pixel as a function of the initial foreground probability of the processed pixel and the initial foreground probability of neighboring pixels, the relative weight of the initial foreground probability of neighboring pixels being determined by the probability propagation coefficients of the neighboring pixels.

12. The system according to claim 11, wherein the assignment engine is configured to apply at least a first heuristic probability assignment algorithm and a second heuristic probability assignment algorithm, and to determine the foreground probability by combining a result of the first heuristic probability assignment algorithm with a result of the second heuristic probability assignment algorithm.

13. The system according to claim 12, wherein one of the first heuristic probability assignment algorithm and the second heuristic probability assignment algorithm comprises comparing the pixels to a background color model.

14. The system according to claim 12, wherein one of the first heuristic probability assignment algorithm and the second heuristic probability assignment algorithm comprises applying a human body model.

15. The system according to claim 12, further configured to update a parameter of at least one of a first heuristic probability allocation algorithm and a second heuristic probability allocation algorithm on the basis of the definitive foreground map.

* * * * *